United States Patent
Dorantes

(10) Patent No.: US 6,467,737 B1
(45) Date of Patent: Oct. 22, 2002

(54) ADJUSTABLE ARM REST FOR USE WITH A PERSONAL COMPUTER

(76) Inventor: David Dorantes, 612 Winterberry Blvd., Jackson, NJ (US) 08527

(*) Notice: Subject to any disclaimer, the term of this patent is extended or adjusted under 35 U.S.C. 154(b) by 0 days.

(21) Appl. No.: 09/667,467

(22) Filed: Sep. 22, 2000

(51) Int. Cl.[7] .................................................. B68G 5/00
(52) U.S. Cl. ..................................... 248/118; 248/118.1
(58) Field of Search ............................ 248/118.1, 118, 248/918

(56) References Cited

U.S. PATENT DOCUMENTS

| | | | | |
|---|---|---|---|---|
| 5,281,001 A | * | 1/1994 | Bergsten et al. | 297/411.24 |
| 5,351,897 A | | 10/1994 | Martin | 244/118 |
| 5,405,109 A | * | 4/1995 | Nordnes | 248/118.3 |
| 5,704,698 A | | 1/1998 | Lin | 312/208.1 |
| 5,743,499 A | * | 4/1998 | Wang | 248/118 |
| 5,833,180 A | | 11/1998 | Baranowsk | 248/118 |

OTHER PUBLICATIONS

PCT, WO 91/14384, Published Oct. 3, 1991, to Gutke, Classification/A47B17/03 // A47C7/54.*

* cited by examiner

*Primary Examiner*—Ramon O. Ramirez
*Assistant Examiner*—Kofi Schutterbrandt
(74) *Attorney, Agent, or Firm*—Goldstein & Lavas, P.C.

(57) ABSTRACT

An adjustable arm rest for use with a personal computer including a support bracket couplable with the forward edge of the desk. The support bracket includes a pivot pin extending upwardly therefrom. A support plate is couplable with the support bracket. An arm support is couplable with the pivot pin of the support bracket to allow the arm support to slide and pivot with respect to the support bracket and the support plate while supporting the user's arm thereon.

6 Claims, 4 Drawing Sheets

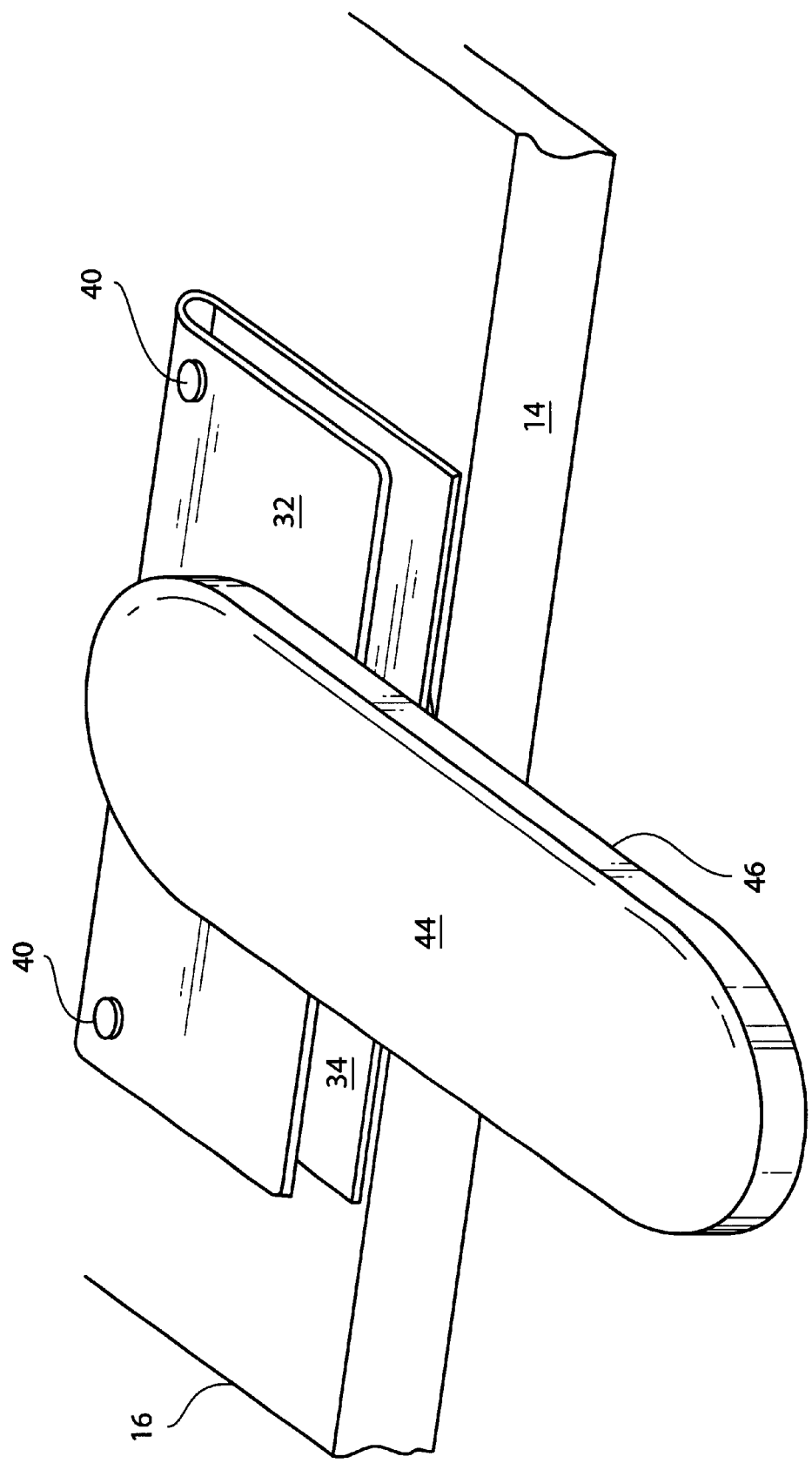

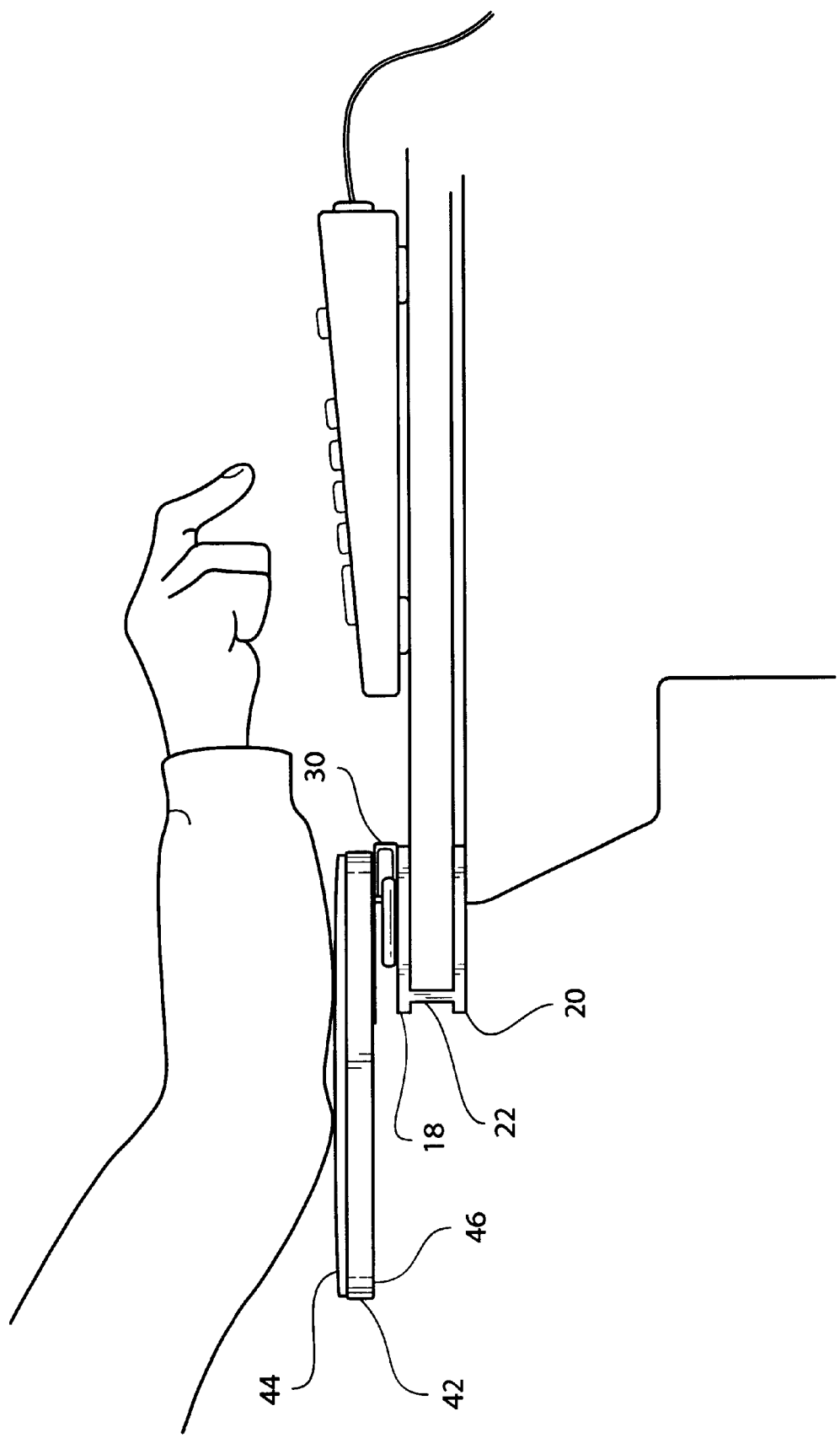

ADJUSTABLE ARM REST FOR USE WITH A PERSONAL COMPUTER

BACKGROUND OF THE INVENTION

The present invention relates to an adjustable arm rest for use with a personal computer and more particularly pertains to supporting a user's arm while using a mouse and keyboard of the computer.

Computer users often suffer many maladies during extensive use of the keyboard and mouse. Users often find themselves bracing their arm against the sharp edge of a desktop while using the keyboard and the mouse. This results in an uncomfortable pressure placed on the lower forearm because the pressure placed on the forearm is not distributed over a large enough area. Alternatively, the user can utilize the arm of their chair for forearm and wrist support, but generally this requires an uncomfortable balance of the mouse pad on the chair arm and, of course, is only possible if the chair is equipped with an arm.

Numerous wrist pads, wrist supports, arm supports, and ergonomic methods known in the art have addressed the problem of providing comfortable use of a computer keyboard and mouse, but none have proven fully comfortable. Thus, there exists a need for a device that will allow the computer user to comfortably use their keyboard and mouse while also preventing any pains in the forearm and wrist.

The present invention attempts to solve the abovementioned problem by providing an arm rest that will comfortably support the user's arm and wrist while using the keyboard and mouse of their computer.

The use of computer related support devices is known in the prior art. More specifically, computer related support devices heretofore devised and utilized for the purpose of facilitating the use of a computer are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,833,180 to Baranowski discloses a forearm and wrist support device attachable to a work surface, for use while operating a computer mouse. U.S. Pat. No. 5,351,897 to Martin and U.S. Pat. No. 5,704,698 to Lin disclose additional computer keyboard support devices.

While these devices fulfill their respective, particular objective and requirements, the aforementioned patents do not describe an adjustable arm rest for use with a personal computer for supporting a user's arm while using a mouse and keyboard of the computer.

In this respect, the adjustable arm rest for use with a personal computer according to the present invention substantially departs from the conventional concepts and designs of the prior art, and in doing so provides an apparatus primarily developed for the purpose of supporting a user's arm while using a mouse and keyboard of the computer.

Therefore, it can be appreciated that there exists a continuing need for a new and improved adjustable arm rest for use with a personal computer which can be used for supporting a user's arm while using a mouse and keyboard of the computer. In this regard, the present invention substantially fulfills this need.

SUMMARY OF THE INVENTION

In the view of the foregoing disadvantages inherent in the known types of computer related support devices now present in the prior art, the present invention provides an improved adjustable arm rest for use with a personal computer. As such, the general purpose of the present invention, which will be described subsequently in greater detail, is to provide a new and improved adjustable arm rest for use with a personal computer which has all the advantages of the prior art and none of the disadvantages.

To attain this, the present invention essentially comprises a support bracket couplable with the forward edge of the desk. The support bracket includes a top plate and a bottom plate disposed in a spaced relationship for being positioned over and below the forward edge of the desk. The top plate and the bottom plate have a central support extending therebetween. The top plate has a slide bar secured thereto. The slide bar has a pivot pin extending upwardly therefrom. The pivot pin has an upper end defined by a stop disk. A support plate is couplable with the support bracket. The support plate includes an upper plate and a lower plate disposed in a spaced relationship and joined at aligned forward ends thereof. The bottom plate of the support plate has a central channel formed therein for being positioned over the slide bar of the top plate of the support bracket. The support plate has a central recess formed therein extending inwardly of the forward ends of the upper plate and lower plate thereof. The top plate of the support plate has a pair of corner stops secured thereto inwardly of the forward edge thereof. An arm support is couplable with the pivot pin of the support bracket. The arm support has a generally elongated rectangular configuration. The arm support has a padded upper surface and a lower surface. The lower surface has a receiving channel formed therein. The receiving channel is defined by a central narrow portion having opposed enlarged end portions. The enlarged end portions receive the stop disk of the pivot pin therein to allow the arm support to slide and pivot with respect to the support bracket and the support plate while supporting the user's arm thereon.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved adjustable arm rest for use with a personal computer which has all the advantages of the prior art computer related support devices and none of the disadvantages.

It is another object of the present invention to provide a new and improved adjustable arm rest for use with a personal computer which may be easily and efficiently manufactured and marketed.

It is a further object of the present invention to provide a new and improved adjustable arm rest for use with a personal computer which is of durable and reliable construction.

An even further object of the present invention is to provide a new and improved adjustable arm rest for use with a personal computer which is susceptible of a low cost of manufacture with regard to both materials and labor, and which accordingly is then susceptible of low prices of sale to the consuming public, thereby making such an adjustable arm rest for use with a personal computer economically available to the buying public.

Even still another object of the present invention is to provide a new and improved adjustable arm rest for use with a personal computer for supporting a user's arm while using a mouse and keyboard of the computer.

Lastly, it is an object of the present invention to provide a new and improved adjustable arm rest for use with a personal computer including a support bracket couplable with the forward edge of the desk. The support bracket includes a pivot pin extending upwardly therefrom. A support plate is couplable with the support bracket. An arm support is couplable with the pivot pin of the support bracket to allow the arm support to slide and pivot with respect to the support bracket and the support plate while supporting the user's arm thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a perspective view of the present invention illustrated secured to a desk.

FIG. 5 is a side view of the present invention illustrated in use.

The same reference numerals refer to the same parts through the various figures.

DESCRIPTION OF THE PREFERRED EMBODIMENT

Figure 1:
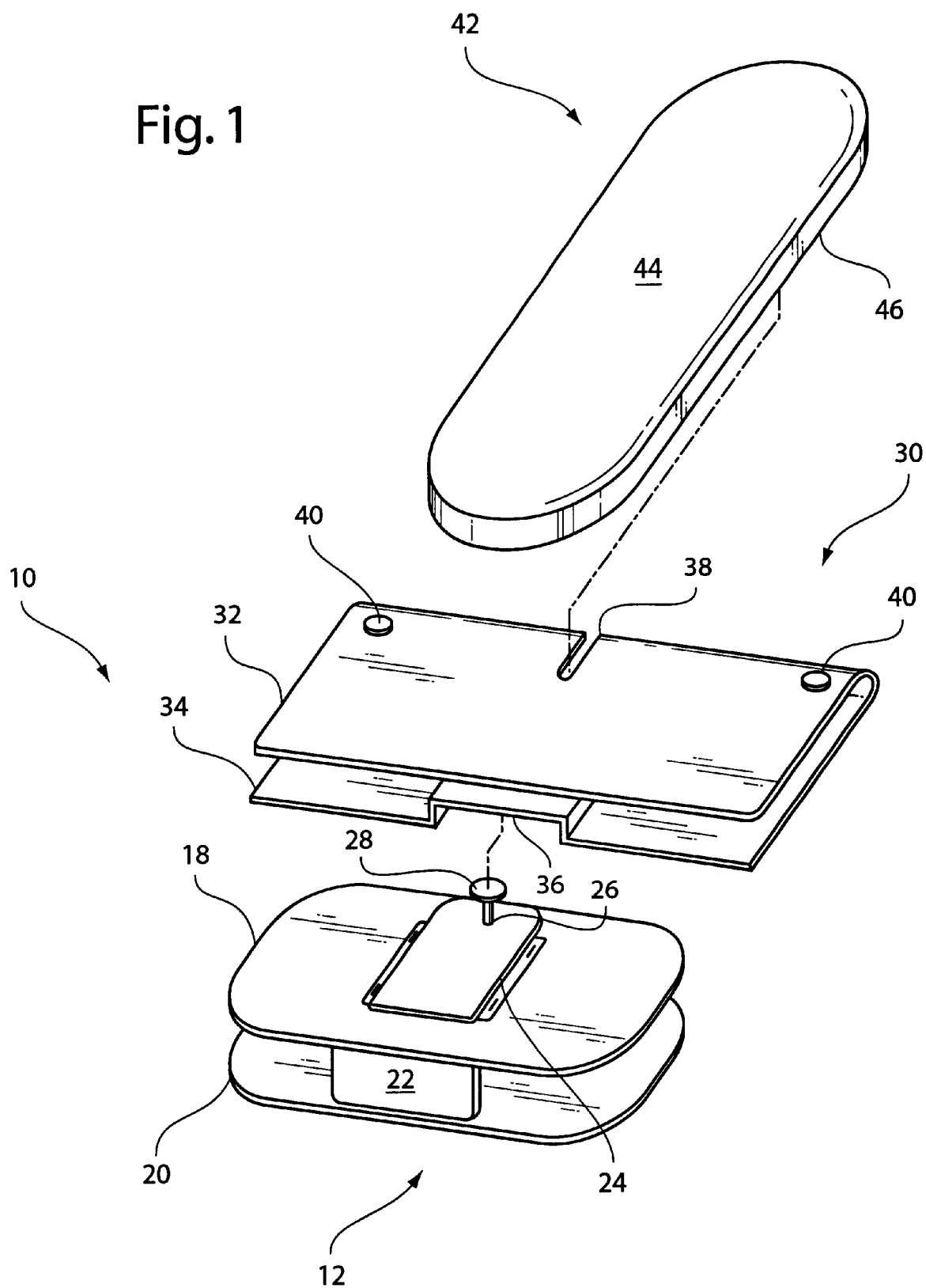
FIG. 1 is a perspective view of the preferred embodiment of the adjustable arm rest for use with a personal computer constructed in accordance with the principles of the present invention.
Figure 4:
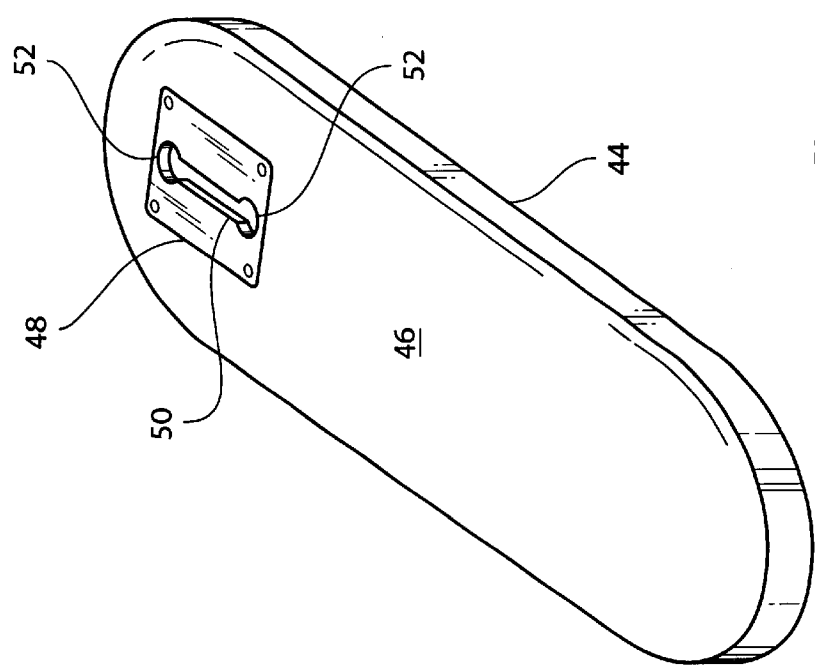
FIG. 4 is a bottom perspective view of the arm support of the present invention.
Figure 3:
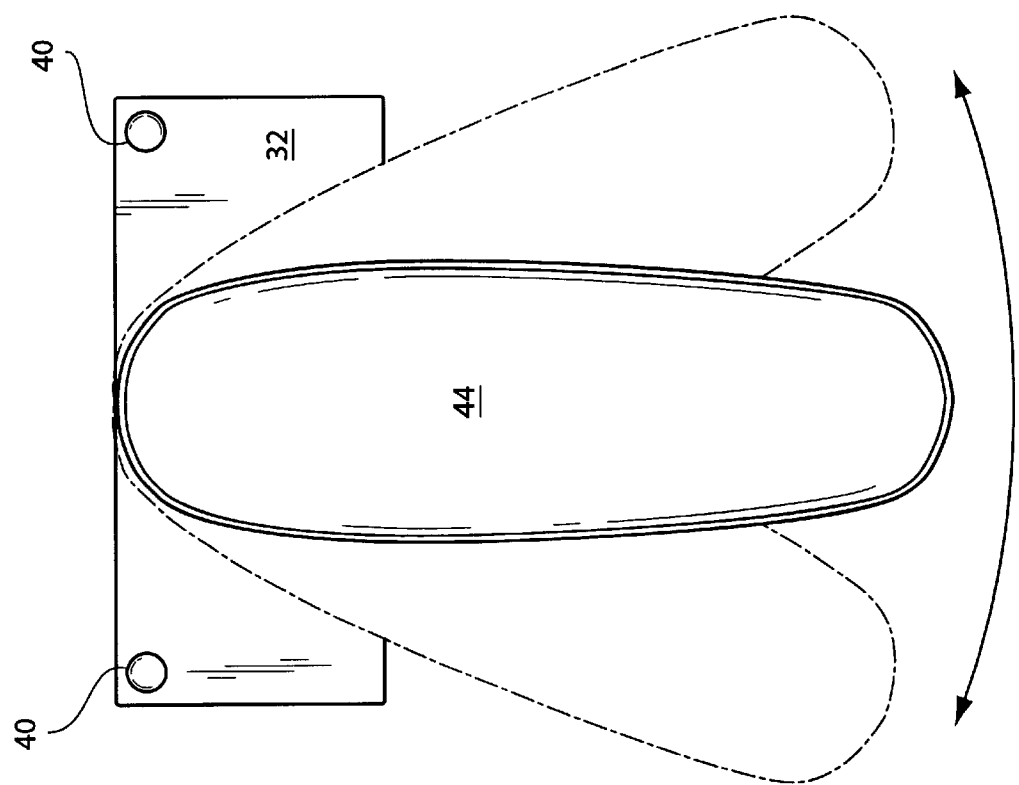
FIG. 3 is a top plan view of the present invention illustrating the pivotability of the arm support.

With reference now to the drawings, and in particular, to FIGS. 1 through 5 thereof, the preferred embodiment of the new and improved adjustable arm rest for use with a personal computer embodying the principles and concepts of the present invention and generally designated by the reference number 10 will be described.

Specifically, it will be noted in the various figures that the device relates to an adjustable arm rest for use with a personal computer for supporting a user's arm while using a mouse and keyboard of the computer. In its broadest context, the device consists of a support bracket, a support plate, and an arm support. Such components are individually configured and correlated with respect to each other so as to attain the desired objective.

The support bracket 12 is couplable with the forward edge 14 of the desk 16. The support bracket 12 includes a top plate 18 and a bottom plate 20 disposed in a spaced relationship for being positioned over and below the forward edge 14 of the desk 16. The top plate 18 and the bottom plate 20 have a central support 22 extending therebetween. The central support 22 also provides a stop when sliding the support bracket on the forward edge 14 of the desk 16. Note FIG. 5. The top plate 18 has a slide bar 24 secured thereto. The slide bar 24 has a pivot pin 26 extending upwardly therefrom. The pivot pin 26 has an upper end defined by a stop disk 28.

The support plate 30 is couplable with the support bracket 12. The support plate 30 includes an upper plate 32 and a lower plate 34 disposed in a spaced relationship and joined at aligned forward ends thereof. The lower plate 34 of the support plate 30 has a central channel 36 formed therein for being positioned over the slide bar 24 of the top plate 18 of the support bracket 12. The support plate 30 has a central recess 38 formed therein extending inwardly of the forward ends of the upper plate 32 and lower plate 34 thereof. The pivot pin 26 of the support bracket 12 will be positioned within the central recess 38. The top plate 32 of the support plate 30 has a pair of corner stops 40 secured thereto inwardly of the forward edge thereof.

The arm support 42 is couplable with the pivot pin 26 of the support bracket 12. The arm support 42 has a generally elongated rectangular configuration. The arm support 42 has a padded upper surface 44 and a lower surface 46. The lower surface 46 has a receiving channel 48 formed therein. The receiving channel 48 is defined by a central narrow portion 50 having opposed enlarged end portions 52. The enlarged end portions 52 receive the stop disk 28 of the pivot pin 26 therein to allow the arm support 42 to slide and pivot with respect to the support bracket 12 and the support plate 30 while supporting the user's arm thereon. The stop disks 40 of the support plate 30 will prevent the over-rotation of the arm support 42 when in use. Note FIG. 3.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An adjustable arm rest for use with a personal computer for supporting a user's arm while using a mouse and keyboard of the computer, wherein the personal computer is positioned on a desk, the desk having a forward edge, the adjustable arm rest comprising, in combination:

a support bracket couplable with the forward edge of the desk, the support bracket including a top plate and a bottom plate disposed in a spaced relationship for being positioned over and below the forward edge of the desk, the top plate and the bottom plate having a central support extending therebetween, the top plate having a slide bar secured thereto, the slide bar having a pivot pin extending upwardly therefrom, the pivot pin having an upper end defined by a stop disk;

a support plate couplable with the support bracket, the support plate including an upper plate and a lower plate disposed in a spaced relationship and joined at aligned forward ends thereof, the bottom plate of the support plate having a central channel formed therein for being positioned over the slide bar of the top plate of the support bracket, the support plate having a central recess formed therein extending inwardly of the forward ends of the upper plate and lower plate thereof, the top plate of the support plate having a pair of corner stops secured thereto inwardly of the forward edge thereof; and an arm support couplable with the pivot pin of the support bracket, the arm support having a generally elongated rectangular configuration, the arm support having a padded upper surface and a lower surface, the lower surface having a receiving channel formed therein, the receiving channel being defined by a central narrow portion having opposed enlarged end portions, the enlarged end portions receiving the stop disk of the pivot pin therein to allow the arm support to slide and pivot with respect to the support bracket and the support plate while supporting the user's arm thereon.

2. An adjustable arm rest for use with a personal computer for supporting a user's arm while using a mouse and keyboard of the computer, wherein the personal computer is positioned on a desk, the desk having a forward edge, the adjustable arm rest comprising, in combination:

a support bracket couplable with the forward edge of the desk, the support bracket having a slide bar and a pivot pin extending upwardly therefrom;

a support plate couplable with the support bracket, wherein the support plate includes an upper plate and a lower plate disposed in a spaced relationship and joined at aligned forward ends thereof, the bottom plate of the support plate having a central channel formed therein for being positioned over the slide bar of the top plate of the support bracket, the support plate having a central recess formed therein extending inwardly of the forward ends of the upper plate and lower plate thereof; and an arm support couplable with the pivot pin of the support bracket to allow the arm support to slide and pivot with respect to the support bracket and the support plate while supporting the user's arm thereon.

3. The adjustable arm rest as set forth in claim 2, wherein the support bracket includes a top plate and a bottom plate disposed in a spaced relationship for being positioned over and below the forward edge of the desk, the top plate and the bottom plate having a central support extending therebetween, the top plate having a slide bar secured thereto, the slide bar having the pivot pin extending upwardly therefrom, the pivot pin having an upper end defined by a stop disk.

4. The adjustable arm rest as set forth in claim 3, wherein the support plate includes an upper plate and a lower plate disposed in a spaced relationship and joined at aligned forward ends thereof, the bottom plate of the support plate having a central channel formed therein for being positioned over the slide bar of the top plate of the support bracket, the support plate having a central recess formed therein extending inwardly of the forward ends of the upper plate and lower plate thereof.

5. The adjustable arm rest as set forth in claim 3, wherein the top plate of the support plate has a pair of corner stops secured thereto inwardly of the forward edge thereof.

6. The adjustable arm rest as set forth in claim 3, wherein the arm support has a generally elongated rectangular configuration, the arm support having a padded upper surface and a lower surface, the lower surface having a receiving channel formed therein, the receiving channel being defined by a central narrow portion having opposed enlarged end portions, the enlarged end portions receiving the stop disk of the pivot pin therein.

* * * * *